United States Patent [19]
Wolf et al.

[11] Patent Number: 4,715,102
[45] Date of Patent: Dec. 29, 1987

[54] MACHINE TOOL

[75] Inventors: Heinz K. Wolf, Willoughby Hills; Jyoti Mukherjee, North Royalton, both of Ohio

[73] Assignee: The Warner & Swasey Company, Cleveland, Ohio

[21] Appl. No.: 925,999

[22] Filed: Oct. 31, 1986

[51] Int. Cl.$^4$ .......................... B23C 1/12; B23P 23/02
[52] U.S. Cl. ........................................ 29/27 R; 29/40; 74/417; 408/35; 409/211
[58] Field of Search ............... 409/201, 209, 211, 216, 409/230, 231, 144, 204; 408/35; 82/28 B, 36 A; 29/27 R, 39, 40, 41, 42, 43, 48.5 R, 48.5 A; 74/417, 423, 405, 814, 815, 816, 826

[56] References Cited

U.S. PATENT DOCUMENTS

| 917,468 | 4/1909 | Libby et al. | |
|---|---|---|---|
| 2,682,698 | 7/1954 | Berthiez | |
| 3,750,244 | 8/1973 | Smith | |
| 4,297,925 | 11/1981 | Ishizuka et al. | 408/35 X |
| 4,378,621 | 4/1983 | Babel | 409/216 X |
| 4,478,540 | 10/1984 | Sachot | 409/211 |
| 4,610,583 | 9/1986 | Malkzkorn | 409/211 |
| 4,632,612 | 12/1986 | Loerch | 409/231 |

FOREIGN PATENT DOCUMENTS 52145  5/1981  Japan .................................. 29/27 R

*Primary Examiner*—Z. R. Bilinsky
*Attorney, Agent, or Firm*—Calvin G. Covell; Raymond J. Eifler

[57] ABSTRACT

An improved machine tool (10) has a driven cutting tool (T) which is rotatable about an axis (C) extending perpendicular to the axis (B) of rotation of a turret (200) when a toolholder (300) is mounted on an end face (203) of the turret (FIG. 7). The cutting tool is rotatable about an axis extending parallel to the axis of rotation of the turret when the toolholder (300) is mounted on a side face (204) of the turret (FIG. 10). A drive assembly (600) is operable to drive the cutting tool when it is mounted on either the end face (203) or the side face (204) of the turret. The drive assembly (600) extends through the turret and has output at a location disposed between the end and side faces (203, 204) of the turret. A pair of actuators are (400, 500) provided to operate the toolholder (300) to engage and release the cutting tool (T) when the toolholder is mounted on either the end face or side face of the turret.

31 Claims, 10 Drawing Figures

MACHINE TOOL

The present invention relates to a machine tool and more specifically to a machine tool having a turret with driven cutting tools.

It has been suggested that a machine tool be constructed with a rotatable turret having driven cutting tools. Some of the driven cutting tools are rotated about axes extending parallel to the axis of rotation of the turret. Other cutting tools are rotated about axes extending perpendicular to the axis of rotation of the turret.

This known machine tool has separate working units for each of the cutting tools. These working units are driven by gears connected with a shaft which extends axially through the turret. Each working unit contains a clutch so that the working unit can be selectively engaged or disengaged to rotate a cutting tool relative to the turret. A machine tool having this construction is described in U.S. Pat. No. 2,682,698 entitled Auxiliary Tool Head Adaptable To Milling And Boring Machines Or Like Machine Tools, issued July 6, 1954.

It has been suggested that a machine tool turret could have a plurality of driven tools which are sequentially rotated by a single drive assembly. The drive assembly includes a shaft which rotates about a stationary axis. When the turret is indexed to move a selected one of the cutting tools to a machining station, a gear driven by the shaft moves into engagement with a gear connected with the selected cutting tool. The shaft then rotates the selected cutting tool. A machine tool having such a construction is disclosed in U.S. Pat. No. 917,468 entitled High Speed Attachment For Lathes, issued Apr. 6, 1909.

Still another known machine tool has a turret upon which rotatable cutting tools are mounted. When a cutting tool is to be rotated, an axially movable coupling member is shifted to connect the cutting tool with a drive train. A machine tool having this construction is shown in U.S. Pat. No. 3,750,244, entitled Turret Lathe, issued Aug. 7, 1973.

A machine tool constructed in accordance with the present invention has a toolholder which can be mounted on either (1) an end face of a turret to rotate a cutting tool about an axis extending perpendicular to the axis of rotation of the turret or (2) a side face of the turret to rotate a cutting tool about an axis extending parallel to the axis of rotation of the turret. The same drive assembly is utilized to drive the toolholder to rotate a cutting tool when the toolholder is mounted on an end or side face of the turret. Therefore, a supply of the different types of toolholders does not have to be maintained.

In order to facilitate the changing of cutting tools when the toolholder is mounted on either an end or side face of the turret, a pair of actuators are provided to operate the toolholder to engage or release a cutting tool. One of the actuators is mounted adjacent to the end face of the turret and the other actuator is mounted adjacent to the side face of the turret. The actuators remain stationary during rotation of the turret so that toolholders at any one of a plurality of locations on the turret can be moved into alignment with the actuators.

DETAILED DESCRIPTION OF THE INVENTION

Figure 1:
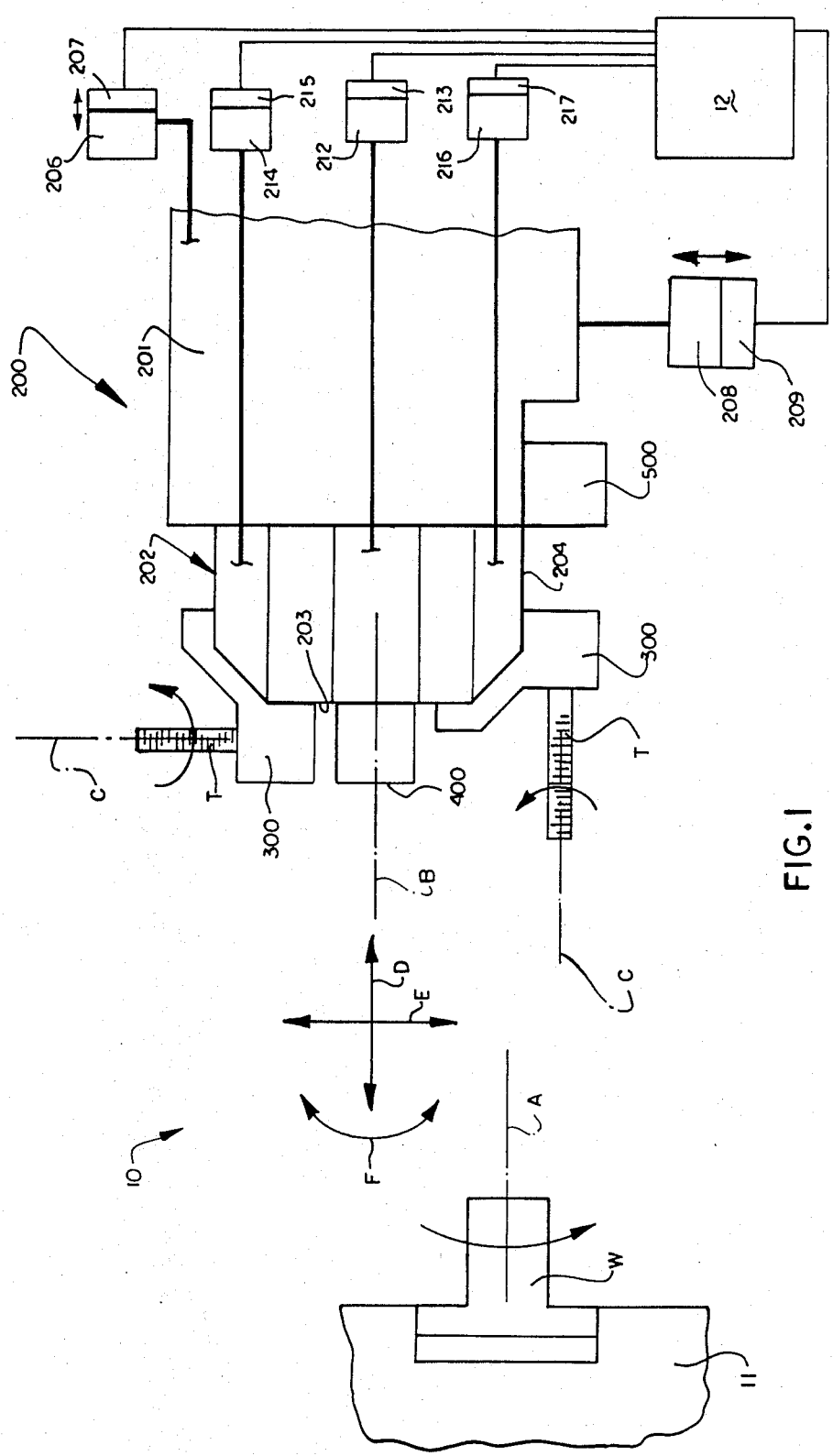
FIG. 1 is a highly schematicized illustration of a machine having a cutting tool which is rotatable about and axis extending parallel to the axis of rotation of a turret an a cutting tool which is rotatable about an axis extending perpendicular to the axis of rotation of the turret.

Referring now to the drawings, FIG. 1 is a schematic illustration of a machine tool 10 having a spindle 11 which rotates a workpiece W about its central axis A. A turret 200 has a base 201 on which a rotatable head portion 202 is mounted. The head portion 202 of the turret 200 is rotatable about its central axis B which is parallel to the spindle axis A.

Turret mounted toolholders 300 are operable to rotate cutting tools T about axes C extending parallel to and perpendicular to the axis B of rotation of the head portion 202 of the turret. Thus, when the toolholder 300 is mounted on a side face 203 of the turret, a cutting tool T (the upper cutting tool in FIG. 1) is rotatable about the toolholder axis C which extends perpendicular to the axis B of rotation of the head portion 202 of the turret. When the toolholder 300 is mounted on an end face 204 of the turret 200, a cutting tool T (the lower cutting tool in FIG. 1) is rotatable about the toolholder axis C which extends parallel to the axis B of rotation of the head portion 202 of the turret.

A toolholder actuator assembly 400 is mounted adjacent to the end face 203 of the head portion 202 of the turret 200. The actuator assembly 400 is operable to actuate the toolholder 300 to release or engage a selected cutting tool T when the toolholder is mounted on the end face 203 of the turret. Similarly, a toolholder actuator assembly 500 is mounted adjacent to the side face 204 of the head portion 202 of the turret 200. The actuator assembly 500 is operable to actuate the toolholder 300 to release or engage a selected cutting tool T when the toolholder is mounted on the side face 204 of the turret.

The head portion 202 of the turret rotates about the axis B relative to the toolholder actuator assemblies 400 and 500. Therefore, the actuator assembly 400 can actuate a toolholder 300 mounted on any one of a plurality of end faces 203 on the turret head portion 202. Similarly, the actuator assembly 500 can actuate a toolholder 300 mounted on any one of a plurality of side faces 204 on the turret head portion 202.

The turret 200 is movable toward and away from the spindle 11 by a reversible electric drive motor 206. Thus, operation of the motor 206 moves the turret 200 either toward or away from the spindle 11 in the manner indicated by the arrow D in FIG. 1. An encoder 207 is connected with the motor 206. The encoder 207 provides an output signal to a machine tool controller 12 indicating the position of the turret 200 along the axis A of rotation of the workpiece W.

A reversible electric motor 208 is operable to move the turret 200 toward and away from the axis A of rotation of the workpiece W in the manner indicated by the arrow E in FIG. 1. An encoder 209 is connected with the motor 208. The encoder 209 provides an output signal to the machine tool controller 12 indicative of the position of the turret 200 in a direction transverse to the axis A of rotation of the workpiece W.

A piston and cylinder type motor 212 is operable to move the head portion 202 of the turret axially away from the base 201, that is in a leftward direction as viewed in FIG. 1, to release the head portion 202 of the turret for rotation relative to the base 201. A sensor assembly 213 provides an output signal to the controller 12 indicating the axial position of the head portion 202 of the turret relative to the base 201.

When the head portion 202 of the turret is spaced from the base 201, a reversible electric motor 214 is operable to rotate the head portion 202 of the turret 200 relative to the base 201 about the axis B in the manner indicated by the arrow F in FIG. 1. An encoder 215 is connected with the motor 214 and is operable to provide an output to the controller 12 indicative of the angular position of the head portion 202 of the turret relative to the base 201.

A reversible electric motor 216 is connectable with the toolholders 300 to sequentially rotate cutting tools T relative to the workpiece. Each of the toolholders 300 can rotate a cutting tool T about the toolholder axis C when the toolholder is at a machining station, that is the lower position shown in FIG. 1. An encoder 217 is connected with the motor 216 to provide an output to the controller 12.

The generally polygonal head portion 202 of the turret 200 has twelve side faces 204 and twelve end faces 203. Six of the side and end faces are not provided with drives for driven tooling and can only be used with static tooling. However, six of the end and side faces 203 and 204, that is every other side and end face about the circumference of the head portion 202 of the turret, are associated with a drive assembly for driven tooling.

Of course, the head portion 202 of the turret could be provided with a greater or lesser number of side and end faces for a greater or lesser number of either driven or static tools.

Figure 2:
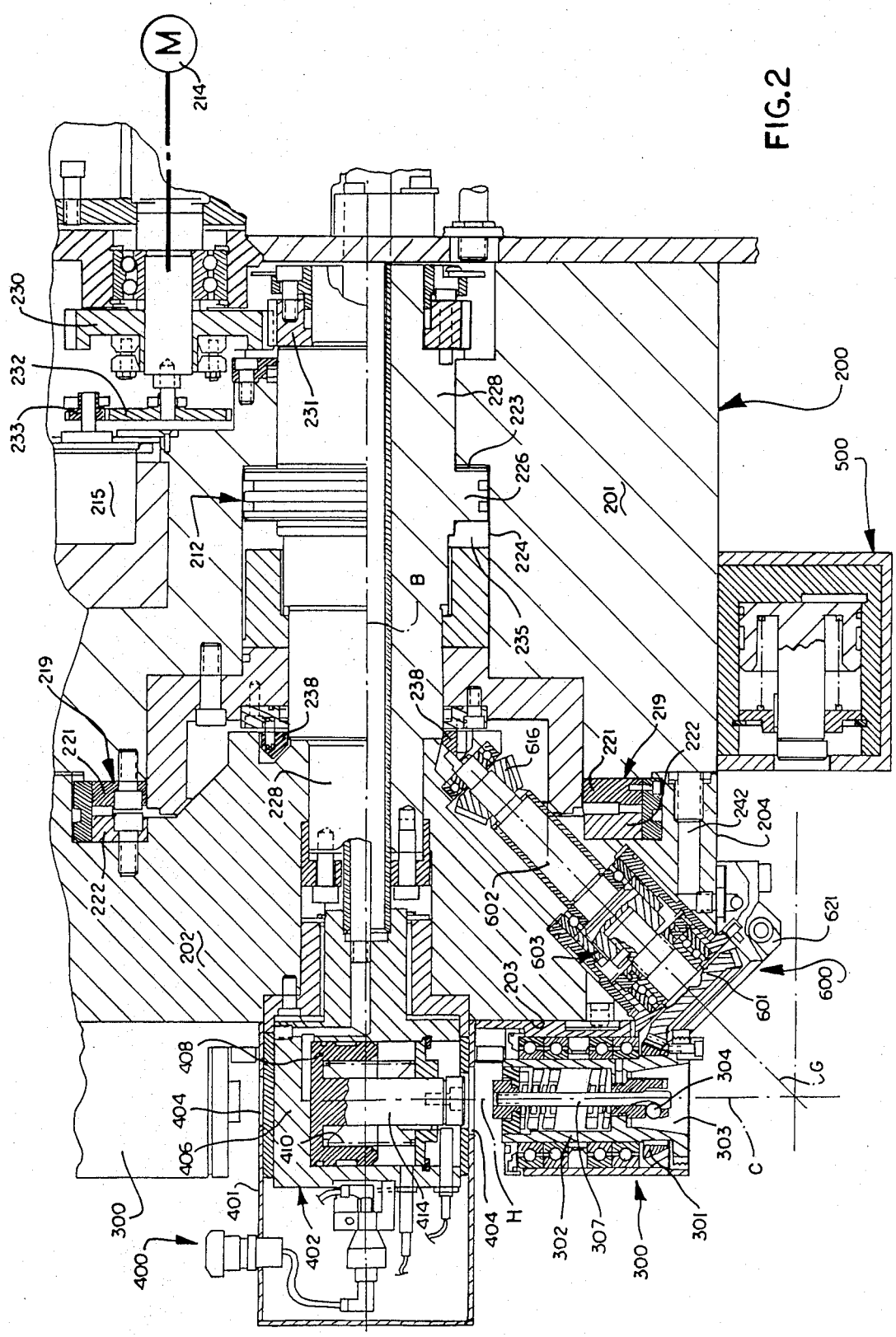
FIG. 2 is a fragmentary sectional view of the turret of FIG. 1 and illustrating and relationship between a toolholder for holding a rotatable cutting tool, a drive assembly for rotating the cutting tool, and an actuator assembly for operating the toolholder to engage or release a cutting tool.

FIG. 2 illustrates the relationship between the toolholder 300 mounted on an end face 203 of the turret 200, the toolholder actuator assembly 400 and a portion of a toolholder drive assembly 600. The turret 200 is shown in FIG. 2 with the head portion 202 of the turret indexed to postion the toolholder 300 at a tool changing station where the toolholder actuator assembly 400 is operable to actuate the toolholder to either release or engage a cutting tool.

The drive assembly 600 is operable to rotate a cutting tool T (FIG. 1) held by a selected one of a plurality of the toolholders 300 when the selected one of the toolholders is at a machining station, that is, the lower position in FIG. 1. In the illustrated embodiment of the machine 10, the tool changing station of FIG. 2 is offset by one index position of the head portion 202 of the turret, that is 30°, from the machining station.

The drive assembly 600 includes an outer drive gear 601 which is rotatable, at the machining station, about a drive assembly axis G. An outer drive shaft 602 is connected to the gear 601 by a coupling assembly 603. The coupling assembly 603 releasably connects the outer drive gear 601 to the outer drive shaft 602.

When the toolholder 300 is at the machining station and a cutting tool is to be rotated about the toolholder axis C, the drive shaft 602 and coupling 603 are rotated to rotate the outer drive gear 601 about the axis G. Rotational forces are transmitted from the outer drive gear 601 to a driven toolholder gear 301 which is disposed in meshing engagement with the outer drive gear 601. The driven toolholder gear 301 is fixedly connected with a toolholder spindle 302 having a socket 303 which receives a tapered end portion of a rotatable cutting tool. A ball lock 304 in the socket 303 engages the rotatable cutting tool to hold it in place.

Although only one outer drive shaft 602, coupling assembly 603, and outer drive gear 601 have been shown in FIG. 2, it should be understood that there is an outer drive shaft, coupling assembly and outer driven gear for each set of end and side faces 203 and 204 upon which a toolholder 300 may be mounted. In the illustrated embodiment of the invention there are six end faces 203 and side faces 204 upon which toolholders 300 may be mounted. Therefore, there are six outer drive gears 601. Each outer drive gear is disposed at a location between an end face 203 and a side face 204. Of course, a coupling assembly 603 and outer drive shaft 602 are connected with each outer drive gear 601.

The head end portion 202 of the turret 200 is movable along the turret axis B in a direction away from the base 201 to operate a Curvic (Trademark) coupling assembly 219 from the engaged condition shown in FIG. 2 to a disengaged condition. When the coupling assembly 219 is in the engaged condition shown in FIG. 2, a pair of annular coupling sections 221 and 222 are disposed in meshing engagement to hold the head portion 202 of the turret 200 against rotation relative to the base 201 of the turret. To release the coupling 219 by operation of the piston and cylinder type motor 212, fluid pressure is directed to an annular end chamber 223 of a cylinder 224 to move a piston 226 toward the left (as viewed in FIG. 2). Leftward movement of the piston 226 causes a shaft 228, which is formed as one piece with the piston, to move the head portion 202 of the turret away from the base 201. This disengages the outer coupling section 222 from the inner coupling section 221 to release the coupling assembly 219.

Once the coupling assembly 219 has been disengaged, the motor 214 is operated to drive a gear 230 and rotate a gear 231 which is fixedly connected to the piston shaft 228. Rotation of the piston shaft 228 rotates the head portion 202 of the turret relative to the base 201. As the head portion 202 of the turret is rotated, the encoder 215 is driven by gears 232 and 233 to provide an output indicative of the position of the head portion 202 of the turret relative to the base 201.

Once the head portion 202 of the turret has been rotated to the desired position relative to the base 201, the motor 212 is operated under the influence of fluid pressure in the left end portion 235 of the cylinder chamber 224, to move the piston 226 rightwardly (as viewed in FIG. 2) to reengage the coupling assembly 219. The engaged coupling assembly 219 holds the head portion 202 of the turret against rotation relative to the base 201.

During rotation of the head portion 202 of the turret relative to the base 201 of the turret, the toolholder 300, outer drive gear 601 and outer drive shaft 602 move with the head portion 202 of the turret relative to the base 201. Thus, the toolholder 300, outer drive gear 601 and outer drive shaft 602 are mounted on the head portion 202 of the turret and move axially outwardly with the head portion of the turret when the coupling 219 is disengaged. Upon rotation of the head portion of the turret 202, the toolholder assembly 300 and outer drive gear 601 and outer drive shaft 602 rotate with the head portion 202 of the turret 200.

The toolholder actuator assembly 400 moves axially outwardly with the head portion 202 of the turret as the coupling 219 is disengaged. However, only an outer housing 401 of the toolholder actuator assembly 400 rotates with the head portion 202 of the turret. A piston and cylinder assembly 402 in the toolholder actuator assembly 400 does not rotate with the head portion 202 of the turret 200. Therefore the piston and cylinder assembly 402 can be opeated to actuate any end face mounted toolholder 300 which is moved to the tool changing station where the toolholder is in alignment with a central axis H of the piston and cylinder assembly.

The axis H of the piston and cylinder assembly 402 is coincident with the central axis C of a toolholder 300 when the toolholder is at the tool changing station. Of course, further rotation of the head portion 202 of the turret will move another end face mounted toolholder 300, into alignment with the axis H of actuation of the toolholder actuator assembly 400.

The rotatable housing 401 is provided with a series of circular openings 404. There is a circular opening 404 aligned with each of the six end faces 203 where a toolholder 300 may be mounted on the head portion 202 of the turret. Therefore, an opening 404 is aligned with the piston and cylinder assembly 402 whenever and end face mounted toolholder 300 is moved to the tool changing station shown in FIG. 2.

The toolholder actuator assembly 500 is operable to actuate toolholders 300 mounted on side faces 204 of the head portion of the turret. The toolholder actuator assembly 500 is mounted on the base 201 of the turret at the tool changing station shown in FIG. 2. The head portion 201 of the turret rotates relative to the toolholder actuator assembly 500. Therefore, the toolholder actuator assembly 500 can be operated to actuate any side face mounted toolholder 300 which is moved to the tool changing station.

Figure 3:
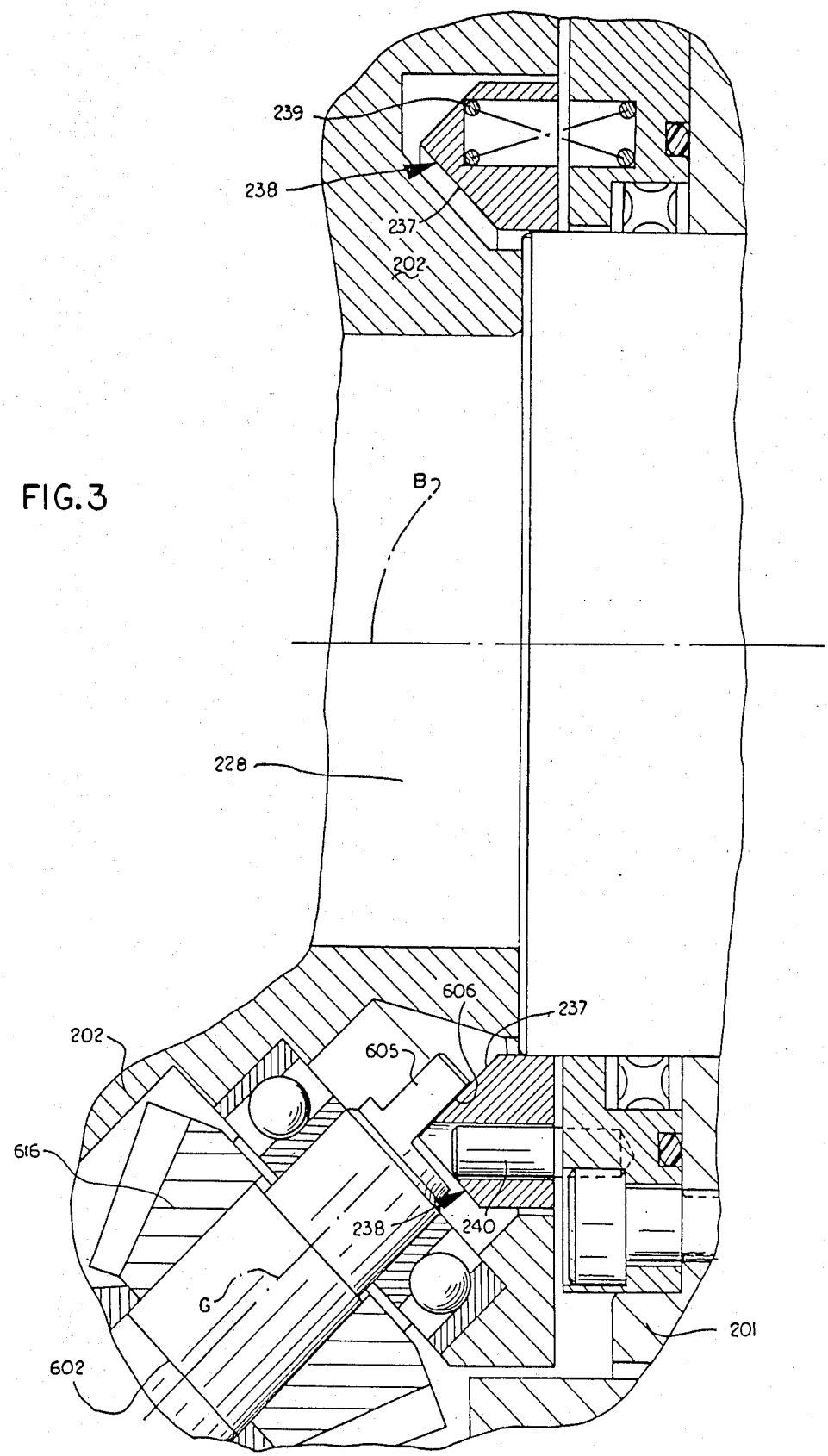
FIG. 3 is an enlarged fragmentary sectional view illustrating the relationship of the drive assembly to a retainer ring which holds a gear in a predetermined orientation during rotation of the turret.

FIG. 3 is an enlarged fragmentary sectional view illustrating the manner in which the outer drive shafts 602 are held against rotation relative to the head portion 202 of the turret during rotation of the head portion of the turret relative to the base portion 201 of the turret. The drive shaft 602 shown in FIG. 3 has an extension 605 with a follower surface 606 which abuttingly engages an annular retaining surface 237 on a circular ring 238. The circular ring 238 has a gap or missing segment in to which the end portion 605 of the outer drive shaft 602 moves when the outer drive shaft 602 is at the machining station. However, when the outer drive shaft 602 is at any location except the machining station, the follower surface 606 engages the annular retainer surface 237 on the ring 238 to hold the outer drive shaft 602 against rotation about its central axis G. Although only one outer drive shaft 602 has been shown in FIG. 3, each of the plurality of outer drive shafts 602 mounted on the head portion 202 of the turret has an end portion 605 which is engagable with the annular retaining surface 237.

In order to maintain the gap or opening in the retainer ring 238 aligned with the machining station, a plurality of pins 240 extend from the base 201 of the turret into cylindrical openings in the ring 237 to hold the ring against rotation relative to the base 201. Therefore, the follower surface 606 on the end portion 605 of the outer drive shaft 602 will always move into the gap in the ring 238 at the same location, that is at the machining station, to release the outer drive shaft 602 for rotation about the axis G.

When the coupling 219 (FIG. 2) is operated from the engaged condition to the disengaged condition, the head portion 202 of the turret is moved away from the base 201 of the turret. As this occurs, the end portion 605 (FIG. 3) of the outer drive shaft 602 moves away from the base 201 of the turret. In order to maintain the retainer surface 237 on the retainer ring 238 in engagement with the follower surface 606 and the end portion 605 of the outer drive shaft 602, a plurality of biasing springs 239 are provided between the annular retainer ring 238 and the base 201 of the turret. the springs 239 move the retainer ring 238 away from the base 201 as the head portion 202 of the turret moves away from the base.

The biasing springs 239 continuously press the retainer surface 237 on the ring 238 against the follower surface 606 on the end portion 605 of the outer drive shaft 602. The pins 240 hold the retainer ring 238 against rotation about the central axis B of the turret under the influence of friction forces applied against the surface 237 by the follower surface 606 as the head portion 202 rotates relative to the base 201. Therefore, the retainer ring is effective to hold the outer drive shafts 602 against rotation when the outer drive shafts are at a location other than the machining station.

Figure 4:
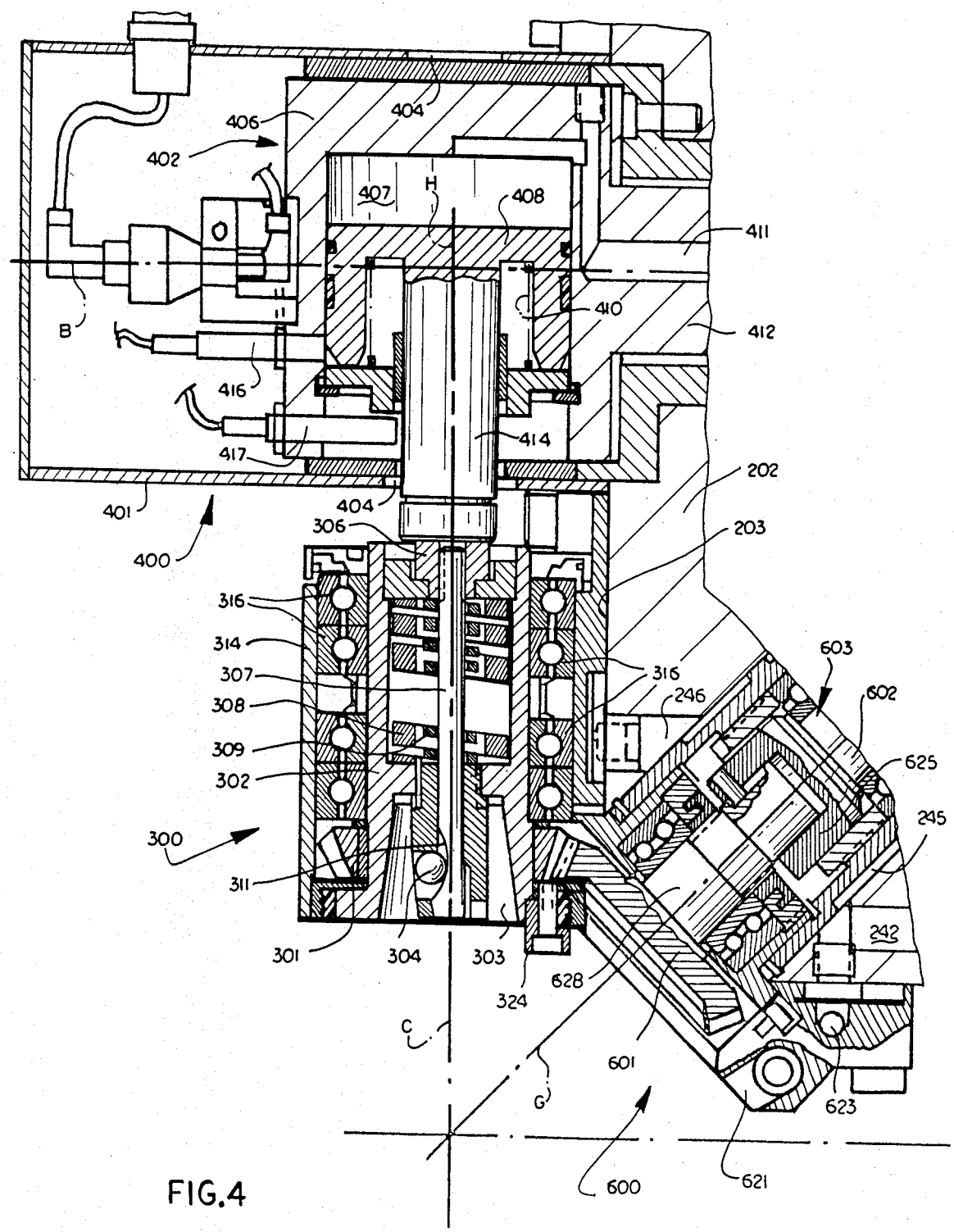
FIG. 4 is an enlarged fragmentary section view further illustrating the relationship between the toolholder and actuator assembly of FIG. 2, the actuator assembly being shown in an extended condition operating the toolholder to release a cutting tool.

FIG. 4 illustrates how the tooholder actuator assembly 400 operates an end face mounted toolholder 300 to release or engage a cutting tool when the toolholder is at the tool changing station. The toolholder actuator assembly 400 inlcudes the piston and cylinder assembly 402 which is fixedly connected with the head portion 202 of the turret 200. The piston and cylinder assembly 402 includes a cylinder 406 having a cylindrical chamber 407 in which a piston 408 is movable along the axis H from the retracted position shown in FIG. 2 to the extended position shown in FIG. 4. Movement of the 408 piston to the extended position actuates the end face mounted toolholder 300 to release a cutting tool held by the toolholder movement of the piston 408 to the retracted position will release the coil springs which in turn will lock a cutting tool inserted into the toolholder socket 303.

The piston 408 is biased toward the retracted position of FIG. 2 by a spring 410. To move the piston 408 to the extended position of FIG. 4 against the influence of the biasing spring 410, fluid pressure is conducted through a passage 411 in a mounting section 412. The mounting section 412 is disposed on the central axis B of the turret 200 and is held against rotation with the head portion 202 of the turret. Therefore, the piston and cylinder assembly 402 remains stationary in the cylindrical housing 401 during rotation of the head portion 202 of the turret.

Fluid pressure conducted through the passage 411 to the cylinder chamber 407 causes the piston 408 to move downwardly (as viewed in FIG. 4). As the piston 408 moves in the cylinder chamber 407, a cylindrical piston rod 414 moves through a circular opening 404 in the housing 401 into engagement with a head end 306 of a toolholder drawbar 307. The drawbar 307 is movable along the central axis C of a rotatable spindle 302 against the influence of a pair of coaxial coil springs 308 and 309.

As the drawbar 307 is moved downwardly by the piston 408, a groove 311 in the lower end portion of the drawbar moves along the ball 304. The groove 311 enables the ball to move inwardly and release a cutting tool held in the socket 303. The next succeeding cutting tool can then be inserted into the socket 303.

Once the next succeeding cutting tool has been inserted into the socket, the fluid pressure conducted through the conduit 411 to the cylinder 406 in the tool actuator assembly 400 is reduced to enable the biasing spring 410 to retract the piston 408. As this occurs, the biasing springs 308 and 309 in the toolholder 300 cause the drawbar 307 to move upwardly (as viewed in FIG. 4). As the drawbar 307 is retracted, the locking ball 304 rolls up a ramp on the groove 311 and is forced against a shoulder on the inside of the cutting tool. The toolholder 300 has the same general construction as Automatic Ball Lock (Trademark) toolholders which are commercially available from Kennametal, Inc., Machining Systems Division, Raleigh, N.C., U.S.A.

A proximity switch 416 detects when the piston 408 is in the extended position of FIG. 4. When the piston 408 is retracted, the proximity switch 416 indicates that the piston 408 has moved to the end of the cylinder chamber 407. A second proximity switch 417 detects the end of the retracted piston rod 414.

Indexing the turret 200 results in rotation of turret head portion 202 and cylindrical housing 401 relative to the retracted piston and cylinder assembly 402. When the next succeeding end face mounted toolholder 300 has moved into axial alingment with the piston and cylinder assembly 402, a circular opening 404 in the housing 401 will be aligned with the piston rod 414 in the manner shown in FIG. 4.

The outer drive gear 601 is disposed in meshing engagement with a driven gear 301 in the toolholder 300. The driven gear 301 is fixedly connected to the rotatable spindle 302. Therefore, rotation of the driven gear 301 by the outer drive gear 601 at the machining station, rotates the spindle 302 and a tool disposed in the socket 303 about the central axis C of the toolholder 300. The cylindrical spindle 302 is supported for rotation relative to a stationary outer housing 314 by bearings 316 disposed between the spindle 302 and the housing 314.

During rotation of the head portion 202 of the turret, the retainer ring 238 (FIG. 3) holds the outer drive shaft 602 against rotation about the axis G. When the outer drive shaft 602 is held against rotation, the outer drive gear 601 (FIG. 4) cannot rotate. Since the outer drive gear 601 is in meshing engagement with the toolholder gear 301, the toolholder gear and spindle 302 cannot rotate. Therefore, the retainer ring 238 holds a cutting tool T mounted in the toolholder 300 against rotation relative to the head portion 202 of the turret as the head portion of the turret is rotated relative to the base 201 of the turret.

Although only the toolholder actuator assembly 400 for actuating end face mounted toolholders 300 has been illustrated in FIG. 4, it should be understood that the toolholder actuator assembly 500 (FIG. 2) for actuating side face mounted toolholders 300 has the same construction and mode of operation as the toolholder actuator assembly 400. Thus, the toolholder actuator assembly includes a piston and cylinder assembly, corresponding to the piston and cylinder assembly 402. The piston and cylinder assembly in the toolholder actuator assembly 500 has a central axis, corresponding to the axis H, which extends parallel to the axis B about which the head portion 202 of the turret rotates. The 201 of the turret and does not move during rotation of the head portion 202 of the turret.

Figure 5:
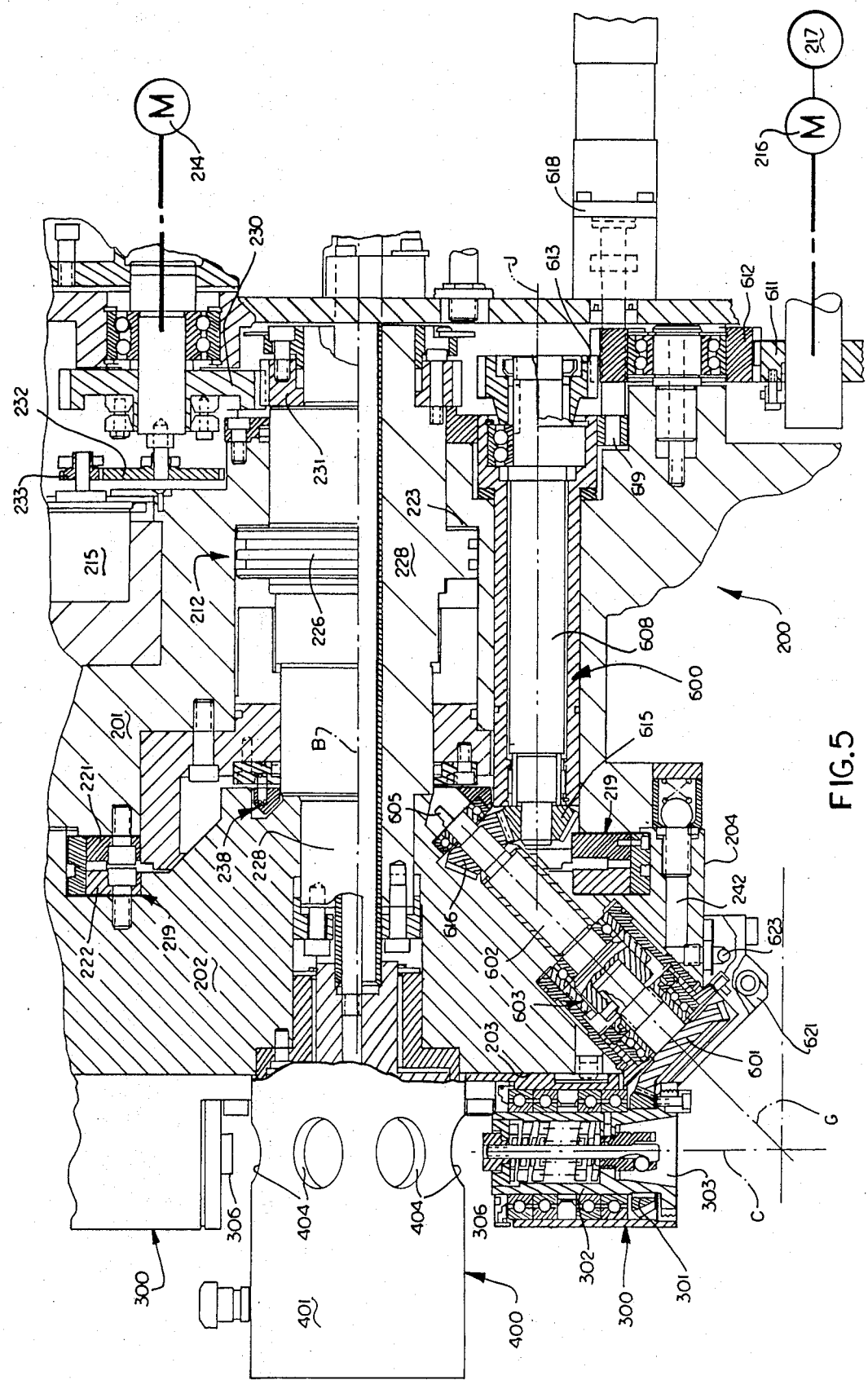
FIG. 5 is a fragmentary sectional view, generally similar to FIG. 2, illustrating the relationship between the toolholder and the drive assembly when the turret has been indexed to position a driven cutting tool at a machining station.

FIG. 5 is a fragmentary sectional view illustrating the relationship between the drive assembly 600 and end face mounted toolholder 300 when the turret 200 has been indexed to position the toolholder at the machining station. At this time, the end portion 605 of the outer drive shaft 602 is disposed at the gap in the annular retaining ring 238. Therefore, the outer drive shaft 602 is free to rotate about the axis G. The axis G extends at a 45° angle to the central axis B of the turret 200 and intersects the central axis C of the toolholder 300 at a location outwardly of the head portion 202 of the turret.

The drive assembly 600 includes an inner drive shaft 608 which is driven by operation of the motor 216. The motor 216 is connected with a gear 611 which drives an idler gear 612. The idler gear 612 meshes with a driven gear 613 which is connected with the right (as viewed in FIG. 5) end of the inner drive shaft 608. Rotation of the gear 613 rotates the inner drive shaft 608 about the axis J. The axis J extends parallel to the axis B about which the head portion 202 of the turret rotates.

The central axis G of the outer drive shaft 602 extends at an angle of 45° to the central axis J of the inner drive shaft 608. The inner and outer drive shafts 602 and 608 are interconnected by a pair of bevel gears 615 and 616. When the outer driven shaft 602 and toolholder 300 are at the machining station, as shown in FIG. 5, the bevel gear 615 is meshingly engagable with the bevel gear 616.

When the gears 615 and 616 are in meshing engagement, rotation of the inner drive shaft 608 is transmitted from the bevel gear 615 to the bevel gear 616 and the outer drive shaft 602. Rotation of the outer drive shaft 602 rotates the outer drive gear 601 and the spindle gear 301 in the toolholder 300. Rotation of the spindle gear 301 rotates the spindle 302 and a cutting tool mounted in the socket 303.

The turret 200 has an outer drive shaft 602 and outer drive gear 601 for each set of end faces 203 and side faces 204 upon which the toolholder 300 can be mounted. Thus, in the illustrated embodiment of the machine tool, there are six outer drive shafts 602 and outer drive gears 601, mounted at 60° intervals, in the head portion 202 of the turret. Of course, a greater or lesser number of outer drive shafts and gears 602 and 601 and sets of end and side faces 203 and 204 could be provided if desired.

The turret 200 has only a single inner drive shaft 608. The inner drive shaft 608 is mounted in the base 201 of the turret and is axially aligned with the machining station. Each of the outer drive gears 601 and shafts 602 can be sequentially driven by the inner drive shaft 608 by rotating the head portion 202 of the turret to move each outer drive shaft and gear in turn to the machining station.

Figure 6:
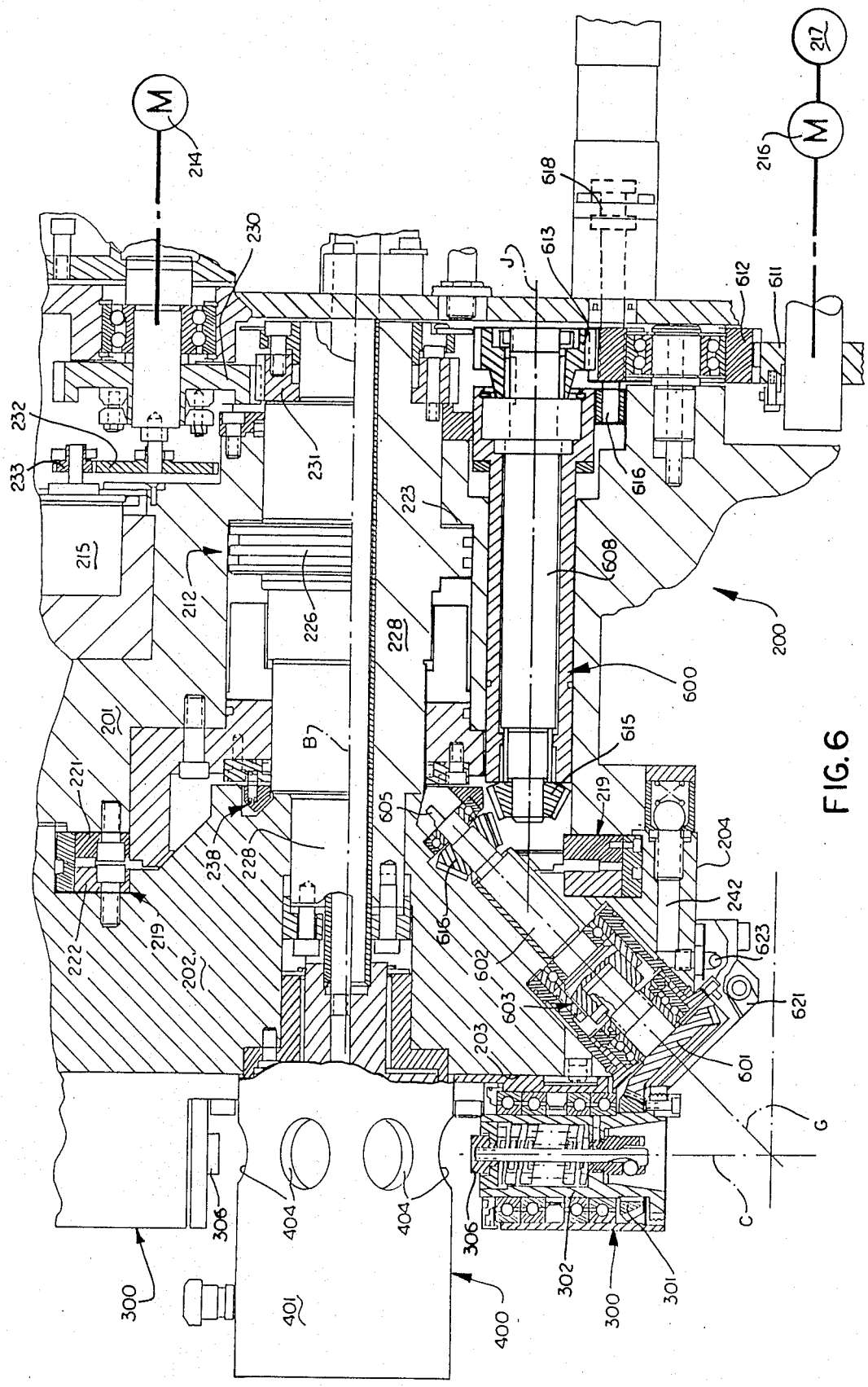
FIG. 6 is a fragmentary sectional view, generally similar to FIG. 5, illustrating the drive assembly in a disengaged condition in which it is ineffective to rotate a cutting tool held by the toolholder.

FIG. 6 illustrates the inner drive shaft 608 in a retracted position in which the bevel gears 615 and 616 are clear of each other. When the drive shaft 608 is in the retracted position, the head portion 202 of the turret 200 can be rotated to move the toolholder 300 to the machining station without interference between the teeth of the bevel gears 615 and 616.

If the bevel gear 615 and drive shaft 608 remained in the extended position shown in FIG. 5 during movement of the bevel gears 616 to the machining station, there could be interference between the teeth of the bevel gear 616 and the teeth of the bevel gear 615. To prevent interference between the teeth of the gears 615 and 616, the drive shaft 608 is moved to the retracted position of FIG. 6 in which the teeth on the gear 615 are clear of the teeth in the gear 616.

As the turret head 202 is rotated to move the toolholder 300 toward the machining station, the outer drive shaft 602 and bevel gear 616 are held in a predetermined orientation by engagement with the retaining ring 238 in the manner shown in FIG. 3. As the turret head 202 is rotated to move the toolholder 300 to the machining station, the end portion 605 of the outer drive shaft 602 moves out of engagement with the retaining ring and is disposed at a gap in the retaining ring. Although the end portion 605 of the other drive shaft 602 has moved out of engagement with retaining ring 238, the drive shaft 602 does not rotate about its central axis due to friction between various components of the toolholder 300 and the outer portion of the drive assembly 600. Therefore, the gear 616 is moved to the machining station with the teeth on the gear in a predetermined orientation relative to the central axis G of the outer drive shaft 602.

Once the toolholder 300 has been moved to the machining station by rotation of the head portion 202 of the turret, the rotation of the head portion of the turret is stopped. The coupling 219 is then reconnected to hold the head portion 202 of the turret against further rotation relative to the base 201 of the turret. The inner drive shaft 608 is then moved from the retracted position of FIG. 6 to the extended position of FIG. 5 to move the bevel gear 615 into meshing engagement with the bevel gear 616.

To move the inner drive shaft 608 from the retracted position of FIG. 6 to the extended position of FIG. 5, a piston and cylinder type motor assembly 618 is operated to move a drive rod 619 connected with the inner drive shaft 608 toward the left (as viewed in FIG. 6). This leftward movement of the rod 619 and inner drive shaft 608 moves the teeth on the bevel gear 615 into meshing engagement with the teeth of the gear 616.

Before the inner drive shaft 608 is moved from the retracted position (FIG. 6) to the extended position (FIG. 5), the motor 216 is operated to rotate the bevel gear 615 until the encoder 217 indicates that the drive shaft 608 and bevel gear 615 are in a predetermined orientation relative to the base 201 of the turret 200. When the bevel gear 615 is in this predetermined orientation, the teeth of the bevel gear 615 are aligned for meshing engagement with the teeth of the bevel gear 616. Thus, prior to movement of the bevel gear 615 into engagement with the bevel gear 616, both bevel gears are located in predetermined orientations relative to each other to prevent interference between the teeth of the gears. The bevel gear 616 is moved to its predetermined orientation by the retaining ring 238 and the bevel gear 615 is moved to its predetermined orientation by the cooperation between the motor 216 and encoder 217.

During a machining operation the load on a cutting tool being rotated by the toolholder 300 may exceed a predetermined maximum value. When this happens, the force between the teeth of the gears 615 and 616 is effective to cause the inner drive shaft 608 to move from the extended position of FIG. 5 toward the retracted position of FIG. 6 against the influence of a relatively low biasing pressure in the hydraulic motor 618. As the drive shaft 608 move toward the retracted position, a proximity switch detects movement of the piston in the motor 618 and provides a signal to cause the controller 12 to interupt operation of the machine tool 10.

When the head portion of 202 of the turret is to be rotated again to move another cutting tool to the machining station, the motor 618 is operated to move the inner drive shaft 608 and gear 615 from the extended position of FIG. 5 to the retracted position of FIG. 6. The motor 212 is then operated to disengage the turret coupling 219. The head portion 202 of the turret is then rotated about the axis B to move a next succeeding cutting tool to the machining station.

Figure 7:
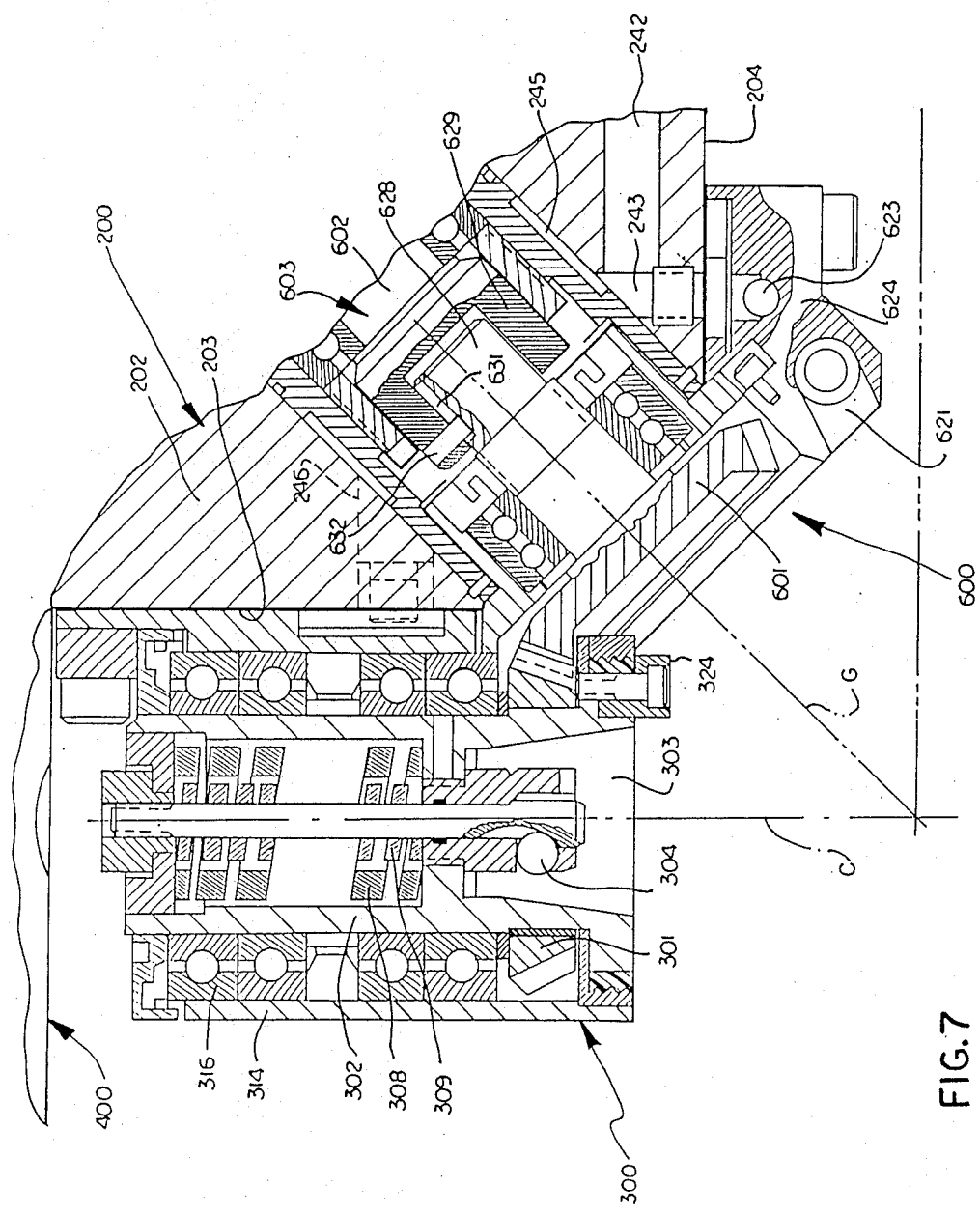
FIG. 7 is an enlarged sectional view illustrating a toolholder mounted on an end face of the turret.

FIG. 7 is an enlarged fragmentary sectional view illustrating the toolholder 300 at the machining station. A central axis C of the toolholder extends perpendicular to the axis B of rotation of the turret and to the axis of rotation A of the workpiece W (FIG. 1). During a cutting operation, coolant is sprayed through a nozzle 621 toward the central axis C of the toolholder 300 and a cutting tool being rotated by the toolholder.

The nozzle 621 is on a side of the outer drive gear 601 opposite from the toolholder 300. This enables the spray from the nozzle 621 to be directed toward both a tool being rotated by the toolholder 300 and the workpiece W. The nozzle 621 is supplied with coolant through passages 242 and 243 formed in the head portion 202 of the turret. Coolant is conducted from the turret passage 243 through the side face 204 to passages 623 formed in a housing 624 for the outer drive gear 601. Additional passages inside the housing 624 (not shown) conduct the coolant to the nozzle 621.

Figure 8:
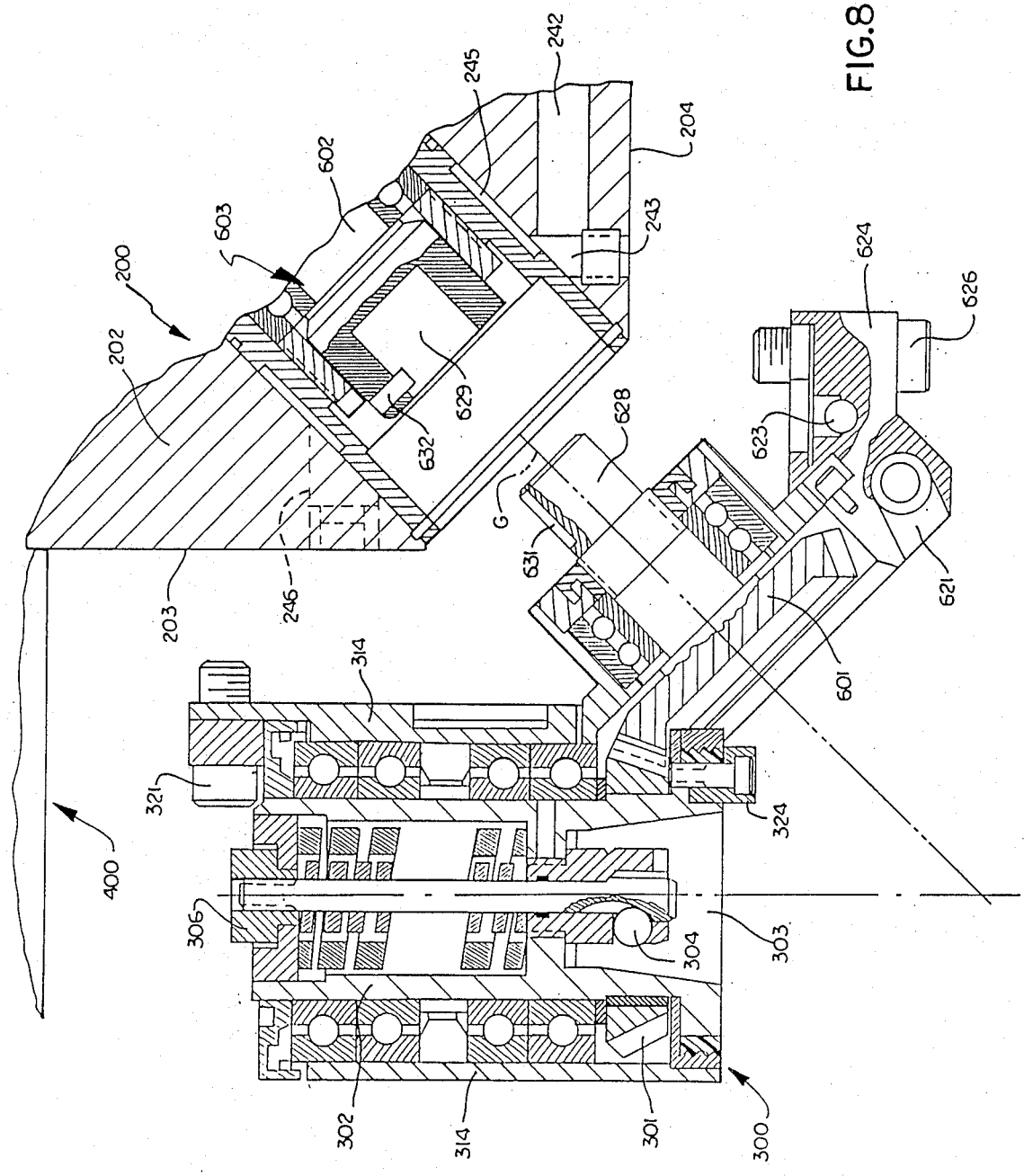
FIG. 8 is an enlarged fragmentary section view, generally similar to FIG. 7, illustrating the toolholder and an outer gear of the drive assembly separated from the end face of the turret and the remainder of the drive assembly.

The toolholder 300 and housing 624 of the outer drive gear 601 can be disconnected from the head portion 202 of the turret 200 in the manner illustrated in FIG. 8. When this is to be done, the head portion 202 of the turret is indexed to move the toolholder 300 of FIG. 8 to a work station which is readily accessible to an operator. Fasteners 321 securing toolholder 300 to the turret end face surface 203 are loosened. In addition, fasteners 626 securing the drive gear housing 624 to the side face 204 of the turret are loosened.

The fixedly interconnected housing 624 of the outer drive gear 601 and the housing 314 of the toolholder 300 are then moved outwardly along the axis G to disengage the coupling 603. As the coupling 603 is disengaged, the stub shaft 628 connected to the outer drive gear 601 moves out of engagement with a socket 629 connected to the outer drive shaft 602. This results in disconnection of the coupling 603.

Figure 9:
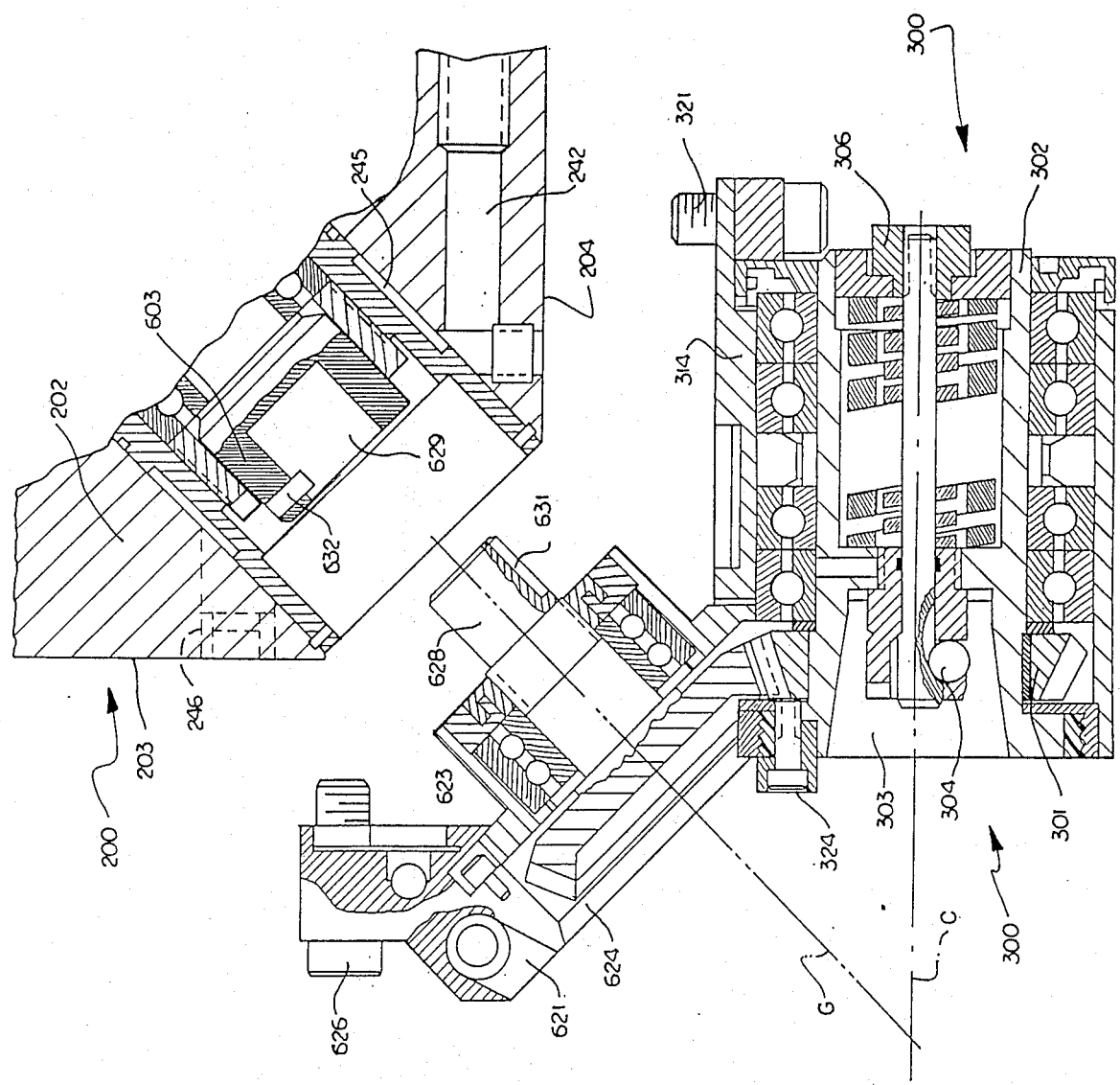
FIG. 9 is an enlarged fragmentary sectional view, generally similar to FIG. 8, illustrating the orientation of the toolholder prior to mounting on a side face of the turret.

FIG. 9 illustrates the orientation of the toolholder 300 and housing 624 for the outer drive gear 601 immediately prior to mounting of the toolholder on the side face surface 204 of the turret 202. Thus, the toolholder 300 and outer drive gear housing 624 are rotated through 180° from the position shown in FIG. 8 to the position shown in FIG. 9. As this occurs, the connection between the housing 624 for the outer drive gear 601 and the housing 314 for the toolholder 300 maintains the outer drive gear 601 meshing engagement with the toolholder drive gear 301.

The shaft 628 of the outer drive gear 601 is rotated through 180° to align a slot 631 in the stub shaft 628 with a pin 632 in the socket 629 of the coupling 603. As the gear 601 is rotated, an indexing pin 324 for a rotatable cutting tool is moved from the position adjacent to the outer drive gear 601 (FIG. 8) to a position spaced from the outer drive gear 601 (FIG. 10).

Figure 10:
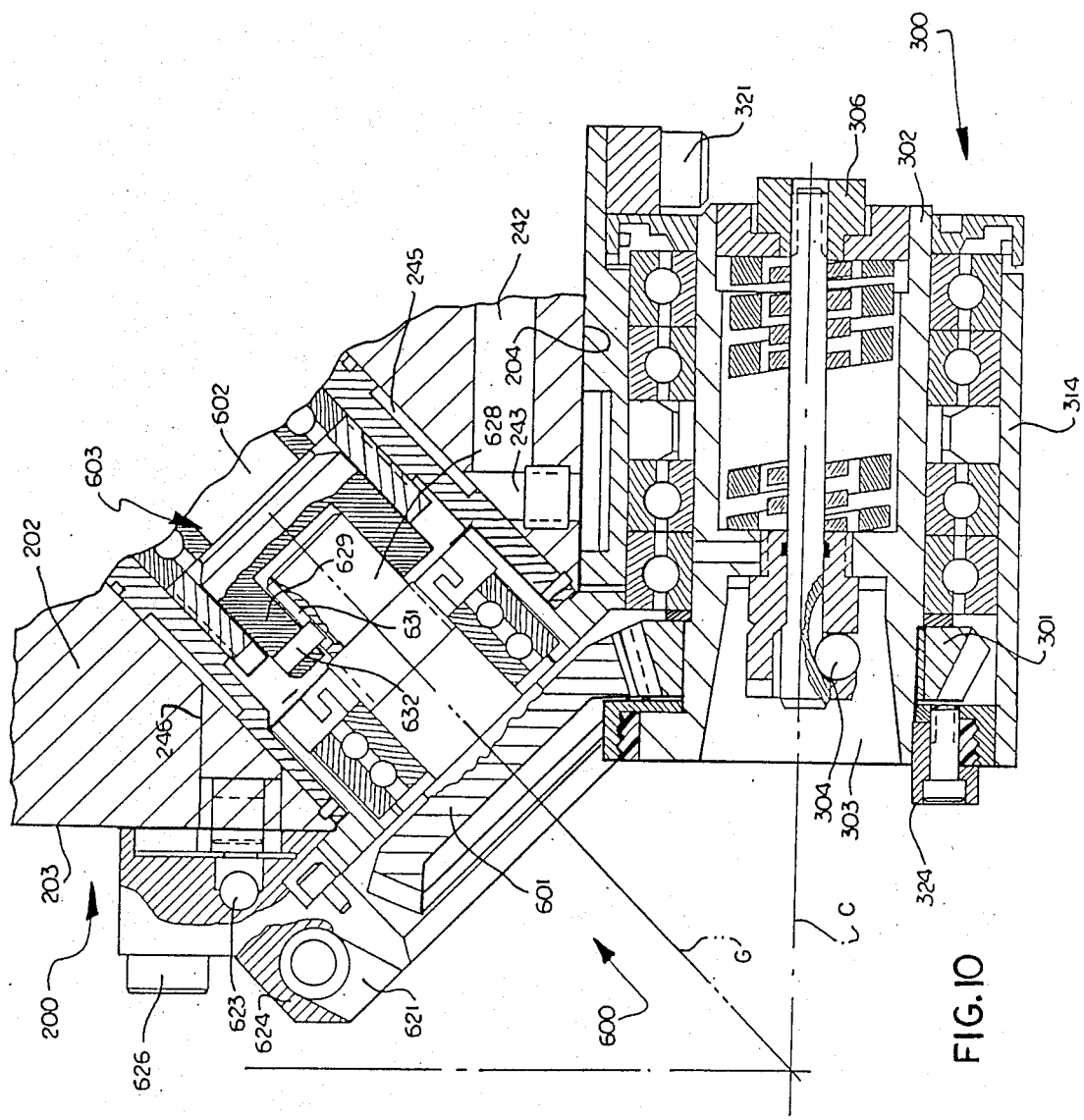
FIG. 10 is an enlarged fragmentary sectional view, generally similar to FIG. 9, illustrating the toolholder mounted on a side face of the turret.

FIG. 10 illustrates how the toolholder 300 is connected with the side face 204 of the head portion 202 of the turret. Thus, fasteners 321 connect the housing 314 of the toolholder 300 with the turret 202. The fasteners 626 connect the motor drive gear housing 624 with the end face 203 of the head portion 202 of the turret. The coupling 603 is reconnected to enable drive forces to be transmitted to the outer drive shaft 602 to the outer drive gear 601 through the socket 629 and stub shaft 628.

The central axis C of the toolholder 300 extends parallel to the side surface 204 and intersects the drive axis G at the same location as before. This is because the relationship between the drive gear 601 and the spindle drive gear 301 is maintained constant by the connection between the drive gear housing 624 and spindle housing 314.

The axis of rotation G of the outer drive gear 601 and outer drive shaft 602 intersect the toolholder axis C at a 45° angle. The end face 203 and side face 204 on the head portion 202 of the turret extend perpendicular to each other. The drive axis G is midway between the end and side faces 203 and 204. Therefore, the toolholder 300 can be mounted to rotate a cutting tool about an axis extending perpendicular to the axis A of rotation of a workpiece (FIG. 7) and about an axis extending parallel to the axis A of rotation of a workpiece (FIG. 10).

When the toolholder 300 is mounted on the side face 204 of the turret and is at the machining station, the nozzle 621 is effective to spray coolant toward the workpiece W and a cutting tool T rotated by the toolholder. At this time the nozzle 621 is adjacent to the end turret face 203 and is supplied with coolant through passages in the head portion 202 of the turret and in the housing 625. Thus, the coolant passages 242 and 243 in the head portion of the turret are connected in fluid communication with an annular passage 245 extending around the coupling 603 and a coolant passage 246 leading to the turret end face 203. The passage 246 is connected in fluid communication with the housing passages 623 and nozzle 621.

OPERATION

When a workpiece W is to be machined, it is mounted on the spindle 11 for rotation about the axis A. As the workpiece W is rotated about the axis A, static or non-driven tools on the head portion 202 of the turret 200 perform machining operations on the workpiece W in a well known manner. In addition, driven tools T in toolholders 300 mounted on end faces 203 and/or side faces 204 of the head portion 202 of the turret are used to perform various machining operations.

Any one of the toolholders 300 can be mounted on either an end face 203 or a side face 204 of the head portion 202 of the turret. When a toolholder 300 is mounted on the end face 203 of the turret 200, the axis of rotation C of the toolholder extends perpendicular to the central axis A of the workpiece W when the toolholder is at the machining station. The end face mounted toolholder 300 can rotate a suitable driven tool T to perform any one of a plurality of different machining operations on the workpiece. For example, a radially extending hole can be drilled in the workpiece or a groove can be milled in the side of the workpiece.

When the cutting tool in the end face mounted toolholder 300 is to be changed, the turret is rotated to bring the toolholder 300 into axial alignment with the central axis H of a piston cylinder assembly 402 in the toolholder actuator assembly 400 (FIG. 2). The toolholder 300 is actuated to a released condition by extending the piston and cylinder assembly 402 in the toolholder actuator assembly 400 (FIG. 4). A selected cutting tool is inserted into the spindle socket 303 of thet toolholder 300. The piston and cylinder assembly 402 is then retracted (FIG. 2) and the selected cutting tool is held in the socket 303 by the locking ball 304.

The piston and cylinder type motor 212 is then operated to move the head portion 202 outwardly away from the base portion 201 of the machine tool. This releases the coupling 219 to enable the head portion 202 of the turret to rotate relative to the base portion 201 of the turret. At this time, the inner drive shaft 608 is in a retracted position (FIG. 6) in which the bevel gear 615 at the outer end of the inner drive shaft 608 is clear of the path of movement of the bevel gear 616 on the outer drive shaft 602.

The motor 214 is then operated to rotate the outer head portion 202 of the turret 200 relative to the base 201. As this occurs, the toolholder 300 and outer drive shaft 602 rotate with the head portion 202 of the turret relative to the base 201. However, the piston and cylinder assembly 402 of the toolholder actuator assembly 400 remains stationary as does the toolholder actuator assembly 500 (FIG. 2).

As the head portion 202 of the turret is rotated, the retainer ring 238 holds the outer drive shaft 602 and bevel gear 616 against rotation. Thus, springs 239 press the annular retainer surface 237 on the ring 238 against the follower surface 606 on the main drive shaft 602 to hold the drive shaft against rotation. Whenever the head portion 202 of the turret is being rotated, the inner drive shaft 608 is in the retracted position (FIG. 6) to keep the gear 615 clear of the gears 616.

As the toolholder 300, outer drive shaft 602 and gear 616 rotate about the central axis B of the turret 200 with the head portion 202, the toolholder is moved to a machining station (FIG. 6). As this occurrs, the end portion 605 of the outer drive shaft 602 moves into a gap formed in the retainer ring 238. However, the gear 616 remains in the same position in which it was previously held by the retainer ring 238.

The piston and cylinder type motor 618 is then operated to move the inner drive shaft 608 along the axis J from the retracted position (FIG. 6) to the extended position (FIG. 5). This engages the gear 615 with the gear 616. Interference between the teeth of the gears 615 and 616 is prevented by having gears in predetermined orientations in which the teeth of the gears are aligned for meshing engagement. Thus, the gear 616 is held in the desired predetermined orientation by the retainer ring 238. The gear 615 is moved to the predetermined orientation by the cooperation of the motor 216 and encoder 217 to position the gear 615 in the same orientation each time the inner drive shaft 608 is to be moved from the retracted position of FIG. 6 to the extended position of FIG. 5.

Once the gears 615 and 616 have moved into meshing engagement, drive motor 216 is operated to rotate the inner drive shaft 608 about the axis J and the outer drive shaft 602 about the axis G. Rotation of the outer drive shaft 602 results in rotation of the outer drive gear 601 and the driven gear 301 in the toolholder 300. Rotation of the driven gear 301 in the toolholder 300 rotates the spindle 302 and a cutting tool held in the socket 303 about the axis C to perform a cutting operation on the workpiece.

If for some unforeseen reason the operating forces applied to the rotating cutting tool become excessive, the force between the gears 615 and 616 is sufficient to overcome the influence of the relatively low fluid pressure in the piston and cylinder assembly 618 and to move the inner drive shaft 608 from the extended position of FIG. 5 toward the retracted position of FIG. 6. This movement of the inner drive shaft 608 is detected by a proximity switch which signals the controller 12. The controller 12 effects operation of the motor 618 to completely retract the inner drive shaft 608.

Once the machining operation has been completed, the motor 216 is operated to rotate the gear 615 back to the predetermined orientation in which it was moved into meshing engagement with the gear 616. This moves the follower surface 606 (FIG. 3) on the end portion 605 of the outer drive shaft 602 into position to engage the retaining ring 238. Once this has been done, the motor 618 is operated to move the inner drive shaft 608 from the extended position of FIG. 5 to the retracted position of FIG. 6.

The head portion 202 of the turret 200 is then moved axially outwardly to disengage the coupling 219. The turret 202 is then rotated about the axis B to move the toolholder 300 away from the machining station. As this occurs, the follower surface 606 (FIG. 3) on the end portion 605 of the outer drive shaft 602 moves into engagement with the retaining ring 238 to hold the gear 616 in the orientation in which it was previously in meshing engagement withthe gear 615. The rotation of the head portion of the turret 202 is interupted when a next succeeding cutting tool has been moved to the machining station.

The toolholder drive assembly 600 can be used to drive the toolholder 300 when it is mounted on the end face 203 or on the side face 204 of the turret 202. This is because the outer drive gear 601 of the toolholder drive assembly 600 is located midway between the end face surface 203 and the side face 204 at a 45° angle.

When the orientation of the toolholder 300 is to be changed from the radial orientation of FIG. 7 to the axial orientation of FIG. 9, the toolholder 300 is disconnected from the end face 203 and the coupling 603 in the toolholder drive assembly 600 is disconnected (FIG. 8). The orientation of the toolholder is then changed so that the toolholder is aligned with the side face 204 of the head portion 202 of the turret 200 (FIG. 9). The coupling 603 is then reconnected and the toolholder 300 is connected with the side face 204.

When the toolholder 300 is in either the radial orientation of FIG. 7 or the axial orientation of FIG. 10, the nozzle 621 can direct a spray of coolant toward the central axis C of the toolholder and a rotating cutting tool held by the toolholder. Thus, when the toolholder 300 is in the radial orientation of FIG. 7, the nozzle 621 is supplied with coolant through the passages 242 and 243 and the head portion 202 of the turret and the passages 623 in the housing 624. when the toolholder 300 is in the axial orientation of FIG. 10, the nozzle 621 is supplied with coolant through passages 242, 243, 245, and 246 formed in the head portion 202 of the turret and the passges 623 in the housing 624.

Having described the invention, what is claimed is:

1. A machine tool (10) having a rotatable turret (200) with an end face (203) extending transversely to the axis of rotation (B) of said turret and a side face (204) extending transversely to said end face, drive means (600) for transmitting drive forces through said turret to an output location between said end and side faces of said turret, said machine tool being characterized by toolholder means (300) for rotating a cutting tool (T) about a first axis (C of FIG. 7) extending perpendicular to the axis (B) of rotation of said turret when said toolholder means is mounted on said end face (203) of said turret and for rotating a cutting tool (T) about a second axis (C of FIG. 10) extending parallel to the axis of rotation (B) of said turret when said toolholder means is mounted on said side face (204) of said turret.

2. A machine tool as set forth in claim 1 wherein said drive means (600) includes a drive gear (601) rotatable about a third axis (G) which extends at an acute angle to said first and second axes (C), said toolholder means (300) including a driven gear (301) which is disposed in meshing engagement with said drive gear and is rotatable about said first axis (C of FIG. 7) by said drive gear when said toolholder means is mounted on said end face of said turret (200), said driven gear (301) being disposed in meshing engagement with said drive gear (601) and being rotatable about said second axis (C of FIG. 10) by said drive gear when said toolholder means is mounted on said side face of said turret.

3. A machine tool (10) having a rotatable turret (200) with an end face (203) extending transversely to the axis of rotation (B) of said turret and a side face (204) extending transversely to said end face, said turret (200) including a base (201), a head portion (202) upon which said end and side faces (203, 204) of said turret are disposed, drive means (600) for transmitting drive forces through said turret to an output location between said end and side faces of said turret, said drive means (600) including a first drive gear (615) rotatably mounted on said base (201) of said turret and a second drive gear (616) rotatably mounted on the head portion of said turret, said machine tool being characterized by toolholder means (300) for rotating a cutting tool (T) about a first axis (C of FIG. 7) extending perpendicular to the axis (B) of rotation of said turret when said toolholder means is mounted on said end face (203) of said turret and for rotating a cutting tool (5) about a second axis (C of FIG. 10) extending parallel to the axis of rotation (B) of said turret when said toolholder means is mounted on said side face (204) of said turret, said head portion of said turret being rotatable relative to said base between a first operating position in which said toolholder means is operable to rotate a cutting tool and any one of a plurality of operating positions in which said toolholder means is ineffective to rotate a cutting tool, and retainer means (238) for holding said second drive gear (616) in a predetermined orientation in which teeth on said second drive gear are positioned for meshing engagement with teeth on said first drive gear (615), said retainer means (238) holding said second drive gear (616) in the predetermined orientation during rotation of said head portion of said turret relative to said base and movement of said second drive gear from said first operating position through said plurality of operating positions, said retainer means (238) releasing said second drive gear (616) for rotation relative to said head portion of said turret upon movement of said second drive gear from one of said plurality of operating positions to said first operating position to enable drive forces to be transmitted from said first drive gear to said second drive gear to rotate said toolholder means (300).

4. A machine tool as set forth in claim 3 wherein said drive means (600) includes a drive gear (601) rotatable about a third axis (G) which extends at an acute angle to said first and second axes (C), said toolholder means (300) including a driven gear (301) which is disposed in meshing engagement with said drive gear and is rotatable about said first axis (C of FIG. 7) by said drive gear when said toolholder means is mounted on said end face of said turret (200), said driven gear (301) being disposed in meshing engagement with said drive gear (601) and being rotatable about said second axis (C of FIG. 10) by said drive gear when said toolholder means is mounted on said side face of said turret.

5. A machine tool as set forth in claim 3 further including first actuator means (400) mounted adjacent to said end face (203) of said turret (200) for operating said toolholder means (300) from an engaged condition holding a cutting tool (T) to a released condition in which the cutting tool can be removed from said toolholder means when said toolholder means is mounted on said end face (203) of said turret, and second actuator means (500) mounted adjacent to said side face (204) of said turret for operating said toolholder means (300) from the engaged condition to the released condition when said toolholder means is mounted on said side face (204) of said turret.

6. An apparatus as set forth in claim 3 further including nozzle means (621) disposed on said toolholder means (300) for directing a flow of coolant toward said first axis (C of FIG. 7) when said toolholder means is mounted on said end face (203) of said turret (200) and for directing a flow of coolant toward said second axis (C of FIG. 10) when said toolholder means is mounted on said side face (204) of said turret.

7. An apparatus as set forth in claim 6 further including passage means (242, 243, 245, 246, 623) for conducting a flow of coolant through said side face (204) of said turret (200) to said nozzle means (621) when said toolholder means (300) is mounted on said end face (203) of said turret (200) and for conducting a flow of coolant through said end face (203) of said turret to said nozzle when said toolholder means is mounted on said side face (204) of said turret.

8. A machine tool as set forth in claim 3 wherein said drive means includes means (216, 217) for rotating said first drive gear (615) to a predetermined position to orient the teeth on said first drive gear (615) for meshing engagement with the teeth on said second drive gear (616).

9. A machine tool as set forth in claim 3 wherein said retainer means includes an arcuate retainer surface (237) connected with said base (201) and extending through a portion of a circle and follower surface means (606) connected with said second drive gear (616) for engaging said retainer surface (237) during movement of said second drive gear from said first operating position through said plurality of operating positions to hold said second drive gear (616) against rotation relative to said head portion (202) of said turret and for moving out of engagement with said retainer surface (237) during rotation of said head portion of said turret to move said second drive gear from one of said plurality of operating positions to said first operating position to thereby release said second drive gear (616) for rotation relative to said head portion fo said turret.

10. An apparatus as set forth in claim 3 wherein said drive means includes means (618) for moving said first drive gear (615) axially between a first position (FIG. 5) in which said first and second drive gears (615, 616) are engaged when said second drive gear (616) is at said first operating position and a second position (FIG. 6) in which said first and second drive gears are disengaged when said second drive gear is at said first operating position.

11. A machine tool as set forth in claim 10 wherein said drive means includes a third drive gear (601) and coupling means (603) for connecting said third drive gear with said second drive gear (616) for rotation therewith relative to said head portion (202) of said turret, said toolholder means including a driven gear (301) which is disposed in meshing engagement with said third drive gear (601) and is rotatable about said first axis (C of FIG. 7) by said third drive gear (601) during rotation of said first and second drive gears (615, 616) when said toolholder means is mounted on said end face (203) of said turret, said coupling means (603) being releasable to enable said third drive gear (601) to be disconnected from said second drive gear (616) to release said toolholder means (300) for movement from a mounting position on the end face (203) of said turret to a mounting position on the side face (204) of said turret, said driven gear (301) being disposed in meshing engagement with said third drive gear (601) and being rotatable about said second axis (C of FIG. 10) by said third drive gear (601) during rotation of said first and second drive gears when said toolholder means is mounted on said side face (204) of said turret.

12. A machine tool (10) having a rotatable turret (200) with an end face (203) extending transversely to the axis of rotation (B) of said turret and a side face (204) extending transversely to said end face, drive means (600) for transmitting drive forces through said turret to an output location between said end and side faces of said turret, said machine tool being characterized by toolholder means (300) for rotating a cutting tool (T) about a first axis (C of FIG. 7) extending perpendicular to the axis (B) of rotation of said turret when said toolholder means is mounted on said end face (203) of said turret and for rotating a cutting tool (T) about a second axis (C of FIG. 10) extending parallel to the axis of rotation (B) of said turret when said toolholder means is mounted on said side face (204) of said turret, first actuator means (400) mounted adjacent to said end face (203) of said turret (200) for operating said toolholder means (300) from an engaged condition holding a cutting tool (T) to a released condition in which the cutting tool can be removed from said toolholder means when said toolholder means is mounted on said end face (203) of said turret, and second actuator means (500) mounted adjacent to said side face (204) of said turret for operating said toolholder means (300) from the engaged condition to the released condition when said toolholder means is mounted on said side face (204) of said turret.

13. An apparatus as set forth in claim 12 further including nozzle means (621) disposed on said toolholder means (300) for directing a flow of coolant toward said first axis (C of FIG. 7) when said toolholder means is mounted on said end face (203) of said turret (200) and for directing a flow of coolant toward said second axis (C of FIG. 10) when said toolholder means is mounted on said side face (204) of said turret.

14. An apparatus as set forth in claim 12 further including passage means (242, 243, 245, 246, 623) for conducting a flow of coolant through said side face (204) of said turret (200) to said nozzle means (621) when said toolholder means (300) is mounted on said end face (203) of said turret (200) and for conducting a flow of coolant through said end face (203) of said turret to said nozzle when said toolholder means is mounted on said side face (204) of said turret.

15. A machine tool as set forth in claim 12 wherein said turret includes a base (201), a head portion (202) upon which said side and end faces (203, 204) of said turret are disposed, said head portion (202) of said turret being rotatable relative to said base (201) and said first and second actuator means (400, 500) to move said toolholder means into and out of alignment with said first and second actuator means.

16. A machine tool (10) having a rotatable turret (200) with an end face (203) extending transversely to the axis of rotation (B) of said turret and a side face (204) extending transversely to said end face, drive means (600) for transmitting drive forces through said turret to an output location between said end and side faces of said turret, said machine tool being characterized by toolholder means (300) for rotating a cutting tool (T) about a first axis (C of FIG. 7) extending perpendicular to the axis (B) of rotation of said turret when said toolholder is mounted on said end face (203) of said turret and for rotating a cutting tool (T) about a second axis (C of FIG. 10) extending parallel to the axis of rotation (B) of said turret when said toolholder means is mounted on said side face (204) of said turret, said drive means (600) including a drive gear (601) rotatable about a third axis (G) which extends at an acute angle to said first and second axes (C), said toolholder means (300) including a driven gear (301) which is disposed in meshing engagement with said drive gear and is rotatable about said first axis (C of FIG. 7) by said drive gear when said toolholder means is mounted on said end face of said turret (200), said driven gear (301) being disposed in meshing engagement with said driven gear (601) and being rotatable about said second axis (C of FIG. 10) by said drive gear when said toolholder means is mounted on said side face of said turret, and nozzle means (621) disposed on side of said drive gear (601) opposite from said toolholder means (300) for directing a flow of coolant toward said first axis (C of FIG. 7) when said toolholder means is mounted on said end face (203) of said turret (200) and for directing a flow of coolant toward said second axis (C of FIG. 10) when said toolholder means is mounted on said side face (204) of said turret.

17. An apparatus as set forth in claim 16 further including passage means (242, 243, 245, 246, 623) for conducting a flow of coolant through sid side face (204) of said turret (200) to said nozzle means (621) when said toolholder means (300) is mounted on said end face (203) of said turret (200) and for conducting a flow of coolant through said end face (203) of said turret to said nozzle when said toolholder means is mounted on said side face (204) of said turret.

18. A machine tool as set forth in claim 16 further including retainer means (238) for holding said drive gear (601) against rotation about said third axis (G) during rotation of said turret, for holding said driven gear (301) against rotation about said first axis (C) during rotation of said turret with said toolholder means mounted on said end face, and for holding said driven gear (301) against rotation about said second axis (C) during rotation of said turret with said toolholder means mounted on said side face (204).

19. A machine tool as set forth in claim 18 wherein said turret (200) includes a base (201) and a head portion (202) which is rotatable relative to said base, said end and side faces (203, 204) of said turret being disposed on said head portion for rotation therewith relative to said base, said retainer means includes first retainer surface means (606) connected with said drive gear (601) for rotation therewith during rotation of said drive gear about said third axis (G) and second retainer surface means (237) connected to said base of said turret and engageable by said first retainer surface means (606) during rotation of said head portion of said turret relative to said base.

20. A machine tool as set forth in claim 16 wherein said drive means includes a drive shaft (602) rotatable about the third axis (G) and coupling means (603) for connecting said drive gear with said drive shaft, said coupling means being releasable to enable said drive and driven gears (601, 301) to be disconnected from said drive shaft (602) to change the mounting location of said toolholder means (300) between said end and side faces (203, 204) of said turret (200).

21. A machine tool as set forth in claim 20 further including housing means (624) for maintaining said drive and driven gears (601, 301) in meshing engagement during a change in the mounting location of said toolholder means (300) between said and side faces of said turret, said coupling means including index surface means (631, 632) for enabling said drive gear to be connected with said drive shaft only when said drive and driven gears (601, 301) are in a predetermined orientation relative to said drive shaft (602).

22. A machine tool (10) having a rotatable turret (200) with an end face (203) extending transversely to the axis of rotation (B) of said turret and a side face (204) extending trasnversely to said end face, driven means (600) for transmitting drive forces through said turret to an output location between said end and side faces of said turret, said machine tool being characterized by toolholder means (300) for rotating a cutting tool (T) about a first axis (C of FIG. 7) extending perpendicular to the axis (B) of rotation of said turret when said toolholder means is mounted on said end face (203 of said turret and for rotating a cutting tool (T) about a second axis (C of FIG. 10) extending parallel to the axis of rotation (B) of said turret when said toolholder means is mounted on said side face (204) of said turret, said drive means (600) including a drive gear (601) rotatable about a third axis (G) which extends at an acute angle to said first and second axes (C), said toolholder means (300) including a driven gear (301) which is disposed in meshing engagement with said drive gear and is rotatable about said first axis (C of FIG. 7) by said drive gear when said toolholder means is mounted on said end face of said turret (200), said driven gear (301) being disposed in meshing engagement with said driven gear (601) and being rotatable about said second axis (C of FIG. 10) by said drive gear when said toolholder means is mounted on said side face of said turret, retainer means (238) for holding said drive gear (601) against rotation about said third axis (G) during rotation of said turret, for holding side driven gear (301) against rotation about said first axis (C) during rotation of said turret with said toolholder means mounted on said end face, and for holding said driven gear (301) against rotation about said second axis (C) during rotation of said turret with said toolholder means mounted on said side face (204).

23. A machine tool as set forth in claim 22 wherein said turret (200) includes a base (201) and a head portion (202) which is rotatable relative to said base, said end and side faces (203, 204) of said turret being disposed on said head portion for rotation therewith relative to said base, said retainer means includes first retainer surface means (606) connected with said drive gear (601) for rotation therewith during rotation of said drive gear about said third axis (G) and second retainer surface means (237) connected to said base of said turret and engageable by said first retainer surface means (606) during rotation of said head portion of said turret relative to said base.

24. A machine tool as set forth in claim 22 wherein said drive means includes a drive shaft (602) rotatable about the third axis (G) and coupling means (603) for connecting said drive gear with said drive shaft, said coupling means being releasable to enable said driven and driven gears (601, 301) to be disconnected from said drive shaft (602) to change the mounting location of said toolholder means (300) between said end and side faces (203, 204) of said turret (200).

25. A machine tool (10) having a rotatable turret (200) with an end face (203) extending transversely to the axis of rotation (B) of said turret and a side face (204) extending transversely to said end face, drive means (600) for transmitting drive forces through said turret to an output location between said end and side faces of said turret, said machine tool being characterized by toolholder means (300) for rotating a cutting tool (T) about a first axis (C of FIG. 7) extending perpendicular to the axis (B) of rotation of said turret when said toolholder means is mounted on said end face (203) of said turret and for rotating a cutting tool (T) about a second axis (C of FIG. 10) extending parallel to the axis of rotation (B) of said turret when said toolholder means is mounted on said side face (204) of said turret, said drive means (600) including a drive gear (601) rotatable about a third axis (G) which extends at an acute angle to said first and second axes (C), said toolholder means (300) including a driven gear (301) which is disposed in meshing engagement with said drive gear and is rotatable about said first axis (C of FIG. 7) by said drive gear when said toolholder means is mounted on said end face of said turret (200), said driven gear (301) being disposed in meshing engagement with said drive gear (601) and being rotatable about said second axis (C of FIG. 10) by said drive gear when said toolholder means is mounted on said side face of said turret, said drive means including a drive shaft (602) rotatable about the third axis (G) and coupling means (603) for connecting said drive gear with said drive shaft, said coupling means being releasable to enable said drive and driven gears (601, 301) to be disconnected from said drive shaft (602) to change the mounting location of said toolholder means (300) between said end and side faces (203, 204) of said turret (200).

26. A machine tool having a base (201), a turret head (202) rotatably mounted on said base, toolholder means (300) mounted on said turret head, drive means (600) for transmitting drive forces from said base to said toolholder means, said drive means including a first drive gear (615) rotatably mounted on said base and a second drive gear (616) rotatably mounted on said turret head, said turret head being rotatable relative to said base between a first operating position in which said first and second drive gears are in meshing engagement and said toolholder means is operable to rotate a cutting tool under the influence of drive forces transmitted by said first ands econd drive gears and any one of a plurality of operating positions in which said first and second drive gears are out of meshing engagement and said toolholder means is ineffective to rotate a cutting tool, said machine tool being characterized by retainer means (238) for holding said second drive gear (616) in a predetermined orientation in which teeth on said second drive gear are positioned for meshing engagement with teeth on said first drive gear (615) during rotation of said turret head relative to said base and movement of said second drive gear from said first operating position through said plurality of operating positions.

27. A machine tool as set forth in claim 26 wherein said retainer means (238) releases said second drive gear (616) for rotation relative to said turret head (202) upon movement of said second drive gear from one of said plurality of operating positions to said first operating position to enable drive forces to be transmitted from said first drive gear to said second drive gear to rotate said toolholder means (300).

28. A machine tool as set forth in claim 26 wherein said drive means includes means (216, 217) for rotating said first drive gear (615) to a predetermined position to orient the teeth on said first drive gear (615) for meshing engagement with the teeth on said second drive gear (616).

29. A machine tool as set forth in claim 26 wherein said retainer means includes an arcuate retainer surface (237) connected with said base (201) and extending through a portion of a circle and follower surface means (606) connected with said second drive gear (616) for engaging said retainer surface (237) during movement of said second drive gear from said first operating position through said plurality of operating positions to hold said second drive gear (616) against rotation relative to said turret head (202) and for moving out of engagement with said retainer surface (237) during rotation of said turret head to move said second drive gear from one of said plurality of operating positions to said first operating position to thereby release said second drive gear (616) for rotation relative to said turret head.

30. An apparatus as set forth in claim 36 wherein said drive means includes means (618) for moving said first drive gear (615) axially between a first position (FIG. 5) in which said first and second drive gears (615, 616) are engaged when said second drive gear (616) is at said first operating position and a second position (FIG. 6) in which said first and second drive gears are disengaged when said second drive gear is at said first operating position.

31. A machine tool as set forth in claim 30 wherein said drive means includes a third drive gear (601) and coupling means (603) for connecting said third drive gear with said second drive gear (616) for rotation therewith relative to said turret head (202), said toolholder means including a driven gear (301) which is disposed in meshing engagement with said third drive gear (601) and is rotatable by said third drive gear (601) during rotation of said first and second drive gears (615, 616) when said toolholder means is mounted on said turret head, said coupling means (603) being releasable to enable said third drive gear (601) to be disconnected from said second drive gear (616) to release said toolholder means (300) for movement from a mounting position on said turret head.

* * * * *